(12) United States Patent
Scharfegger et al.

(10) Patent No.: US 9,431,653 B2
(45) Date of Patent: Aug. 30, 2016

(54) STRUCTURALLY STABLE ACTIVE MATERIAL FOR BATTERY ELECTRODES

(71) Applicant: VARTA Micro Innovation GmbH, Graz (AT)

(72) Inventors: Michaela Scharfegger, Graz (AT); Harald Kren, Graz (AT); Stefan Koller, Graz (AT)

(73) Assignee: Varta Micro Innovation GmbH (DE)

( * ) Notice: Subject to any disclaimer, the term of this patent is extended or adjusted under 35 U.S.C. 154(b) by 36 days.

(21) Appl. No.: 14/345,108

(22) PCT Filed: Sep. 19, 2012

(86) PCT No.: PCT/EP2012/068430
§ 371 (c)(1),
(2) Date: Mar. 14, 2014

(87) PCT Pub. No.: WO2013/045327
PCT Pub. Date: Apr. 4, 2013

(65) Prior Publication Data
US 2014/0342232 A1    Nov. 20, 2014

(30) Foreign Application Priority Data

Sep. 26, 2011   (EP) .................................. 11182723

(51) Int. Cl.
| | | |
|---|---|---|
| *H01M 4/04* | (2006.01) | |
| *H01M 4/36* | (2006.01) | |
| *H01M 4/133* | (2010.01) | |
| *H01M 4/134* | (2010.01) | |
| *H01M 4/1393* | (2010.01) | |
| *H01M 4/1395* | (2010.01) | |
| *H01M 4/587* | (2010.01) | |
| *H01M 4/62* | (2006.01) | |
| *H01M 10/0525* | (2010.01) | |
| *H01M 4/02* | (2006.01) | |

(52) U.S. Cl.
CPC ........... *H01M 4/366* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/587* (2013.01); *H01M 4/624* (2013.01); *H01M 4/625* (2013.01); *H01M 10/0525* (2013.01); *H01M 4/02* (2013.01); *H01M 2004/021* (2013.01); *H01M 2004/024* (2013.01); *H01M 2004/027* (2013.01); *Y02E 60/122* (2013.01); *Y02P 70/54* (2015.11)

(58) Field of Classification Search
CPC ....... H01M 4/02; H01M 4/133; H01M 4/134
See application file for complete search history.

(56) References Cited

U.S. PATENT DOCUMENTS

| | | | | |
|---|---|---|---|---|
| 6,432,579 | B1 * | 8/2002 | Tsuji ....................... | H01M 4/02 29/623.1 |
| 6,589,696 | B2 | 7/2003 | Matsubara et al. | |
| 2002/0148107 | A1 * | 10/2002 | Rahim ..................... | H01B 1/24 29/623.5 |

(Continued)

FOREIGN PATENT DOCUMENTS

| | | |
|---|---|---|
| CN | 101439972 | 5/2009 |
| DE | 10 2008 063 552 | 6/2010 |
| WO | 2010/014966 | 2/2010 |

*Primary Examiner* — Stewart Fraser
*Assistant Examiner* — Olatunji Godo
(74) *Attorney, Agent, or Firm* — DLA Piper LLP (US)

(57) ABSTRACT

A process of producing active material for an electrode of an electrochemical cell includes providing lithium-intercalating carbon particles having an average particle size of 1 μm to 100 μm as component 1, providing silicon particles having an average particle size of 5 nm to 500 nm as component 2, providing a polymer or polymer precursor which can be pyrolyzed to form amorphous carbon and is selected from the group consisting of epoxy resin, polyurethane resin and polyester resin, as component 3, mixing components 1 to 3 in to a mixture and heat treating the mixture substantially in the absence of atmospheric oxygen at a temperature at which the pyrolyzable polymer or the pyrolyzable polymer precursor decomposes to form amorphous carbon.

12 Claims, 3 Drawing Sheets

(56) References Cited

U.S. PATENT DOCUMENTS

| | | |
|---|---|---|
| 2005/0136330 A1 | 6/2005 | Mao et al. |
| 2005/0214644 A1* | 9/2005 | Aramata ............... H01B 1/122 429/218.1 |
| 2006/0035149 A1 | 2/2006 | Nanba et al. |
| 2009/0252864 A1 | 10/2009 | Carel |
| 2010/0285359 A1* | 11/2010 | Hwang ................ H01M 4/133 429/219 |
| 2011/0136017 A1 | 6/2011 | Singh et al. |
| 2011/0309310 A1 | 12/2011 | Koller et al. |

* cited by examiner

STRUCTURALLY STABLE ACTIVE MATERIAL FOR BATTERY ELECTRODES

TECHNICAL FIELD

This disclosure relates to a process of producing active material for the electrode of an electrochemical cell. It further relates to active material produced by the process and also electrodes and electrochemical cells comprising such an active material.

BACKGROUND

The term "battery" originally meant a plurality of electrochemical cells connected in series in a housing. However, even single electrochemical cells are nowadays frequently referred to as a battery. During discharge of an electrochemical cell, an energy-supplying chemical reaction made up of two electrically coupled, but spatially separated part reactions takes place. A part reaction which takes place at a relatively low redox potential proceeds at the negative electrode and a part reaction takes place at a relatively high redox potential at the positive electrode. During discharge, electrons are liberated by an oxidation process at the negative electrode, resulting in an electron current which flows via an external load to the positive electrode which takes up a corresponding quantity of electrons. Thus, a reduction process takes place at the positive electrode. At the same time, an ion current corresponding to the electrode reaction flows within the cell. This ion current is ensured by an ionically conductive electrolyte. In secondary cells and batteries, this discharging reaction is reversible, i.e. it is possible to reverse transformation of chemical energy into electric energy which occurred during discharge. Where the terms "anode" and "cathode" are used in this context, the electrodes are generally named according to their function during discharging. The negative electrode in such cells is thus the anode, and the positive electrode is the cathode.

Among secondary cells and batteries, comparatively high energy densities are achieved by cells and batteries based on lithium ions. These generally have composite electrodes which comprise not only electrochemically active components, but also electrochemically inactive components. Possible electrochemically active components (often also referred to as active materials) for cells and batteries based on lithium ions are essentially all materials which can take up lithium ions and release them again. In this context, particles based on carbon, in particular, e.g. graphitic carbon, or nongraphitic carbon materials capable of intercalation of lithium are known for the negative electrode. Furthermore, it is also possible to use metallic and semimetallic materials which can be alloyed with lithium. Thus, for example, the elements tin, antimony and silicon are able to form intermetallic phases with lithium. For the positive electrode, the active materials used industrially at the present point in time comprise, in particular, lithium-cobalt oxide ($LiCoO_2$), $LiMn_2O_4$ spinel, lithium-iron phosphate ($LiFePO_4$) and derivatives such as $LiNi_{1/3}Mn_{1/3}Co_{1/3}O_2$ or $LiMnPO_4$. All electrochemically active materials are generally present in particle form in the electrodes.

As electrochemically inactive components, mention may be made first and foremost of electrode binders and power outlet leads. Electrons are supplied to or conducted away from the electrodes by power outlet leads. Electrode binders ensure the mechanical stability of the electrodes and contacting of the particles of electrochemically active material with one another and with the power outlet lead. Conductivity-improving additives, which can likewise be subsumed under the collective term "electrochemically inactive components", can likewise contribute to an improved electric connection between the electrochemically active particles and the power outlet lead. All electrochemically inactive components should be electrochemically stable at least in the potential range of the respective electrode and have a chemically inert character in the presence of customary electrolyte solutions. Customary electrolyte solutions are, for example, solutions of lithium salts such as lithium hexafluorophosphate in organic solvents such as ethers and esters of carbonic acid.

An electrode active material containing nanosize silicon particles is known from WO 2010/014966 A1. The particles are embedded in a polymer electrolyte, optionally, together with carbon particles. The polymer electrolyte is able to equalize volume changes of the silicon and optionally carbon particles during charging and discharging operations.

US 2006/0035149 A1 discloses an electrode active material which can have carbon fibers in addition to silicon-carbon composite particles.

US 2005/0136330 A1 and US 2009/0252864 A1 disclose electrode active materials comprising silicon-carbon composite particles for lithium ion batteries. The composite particles are produced by coating silicon particles with a coating material selected from the group consisting of petroleum, tar, phenolic resins, sugars, polyacrylonitrile and lignin, followed by pyrolysis of the decomposition material.

An important factor for the performance of secondary lithium ion cells is the fact that even during the first charging/discharging cycle of such cells (known as activation), a covering layer which generally consists of electrolyte decomposition products and oxidized lithium is formed on the surface of the electrochemically active materials in the anode. The covering layer is referred to as "solid electrolyte interface" (SEI). The SEI is in the ideal case permeable only for the extremely small lithium ions and prevents further direct contact of the electrolyte solution with the electrochemically active material in the anode. In this respect, formation of the SEI has positive effects. However, a disadvantage is that mobile lithium is lost in the formation of the SEI and at the same time the internal resistance of the cell increases.

It could therefore be helpful to provide a novel, alternative electrode active material which makes it possible to construct batteries having a relatively high energy density, but which at the same time has fewer disadvantages than the abovementioned known active materials.

SUMMARY

We provide a process of producing active material for an electrode of an electrochemical cell including providing lithium-intercalating carbon particles having an average particle size of 1 µm to 100 µm as component 1, providing silicon particles having an average particle size of 5 nm to 500 nm as component 2, providing a polymer or polymer precursor which can be pyrolyzed to form amorphous carbon and is selected from the group consisting of epoxy resin, polyurethane resin and polyester resin, as component 3, mixing components 1 to 3 in to a mixture and heat treating the mixture substantially in the absence of atmospheric oxygen at a temperature at which the pyrolyzable polymer or the pyrolyzable polymer precursor decomposes to form amorphous carbon.

We also provide an electrochemical active material for a negative electrode of an electrochemical cell produced by the process as claimed in claim 1, including lithium-intercalating carbon particles whose surface is at least partly covered with a layer of amorphous carbon, wherein silicon particles having an average particle size of 5 nm to 500 nm are embedded in the layer.

We further provide an electrode including an electrochemical active material as claimed in claim 11.

Lastly, we provide an electrochemical cell including an electrode as claimed in claim 12.

DETAILED DESCRIPTION

Figure 1:
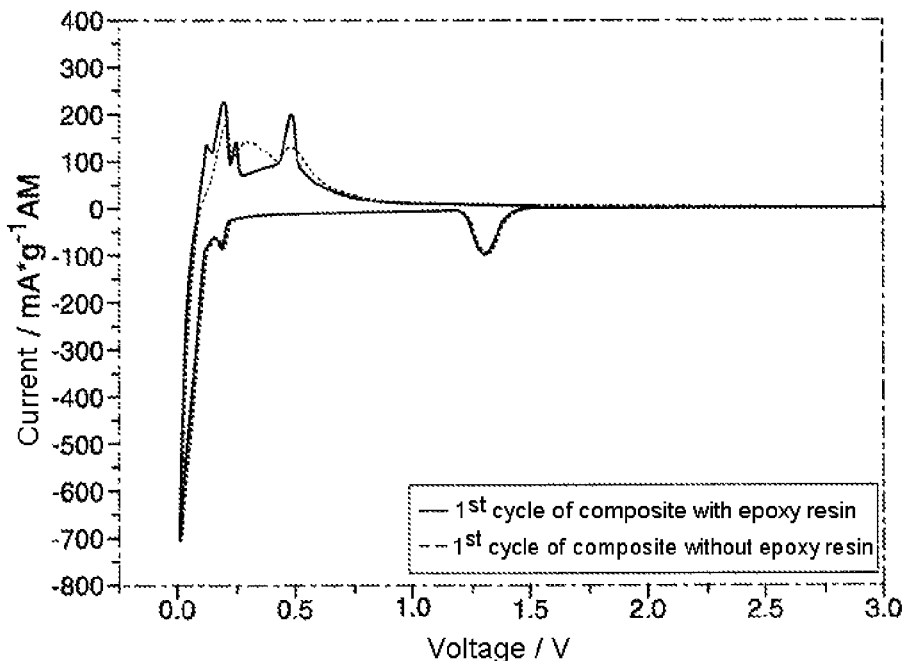
FIG. 1 is a graph showing a first cycle of a cyclic voltammogram of two electrodes.

Our process is employed in the production of active materials for electrodes of electrochemical cells, in particular cells based on lithium ion technology, i.e. of material which during the course of the above-described charging and discharging processes incorporates or releases lithium ions or alloys with lithium. It always comprises the following steps:

In one step, lithium-intercalating carbon particles, hereinafter also referred to as component 1, are provided. These have sizes in the micron range: their average particle size is preferably 1 μm to 100 μm. Within this range, average particle sizes of 5 μm to 50 μm are more preferred. Carbon materials capable of intercalating lithium have been mentioned at the outset. The carbon particles are particularly preferably particles having a graphite structure.

In a further step, particles composed of metallic silicon, hereinafter also referred to as component 2, are provided. These are nanosize: they preferably have an average particle size of 10 nm to 500 nm. Within this range, average particle sizes of 10 nm to 250 nm, in particular 10 nm to 100 nm, are more preferred.

As a third component, a polymer or a polymer precursor from which the polymer can be formed is provided. The polymer is characterized in that it can be converted by pyrolysis into amorphous carbon.

In a further step, the components 1 to 3 are processed to form a mixture. Here, the conversion of the monomer precursor into the polymer can optionally also take place or at least be commenced. Details on this follow.

The mixture is subsequently heat treated with exclusion of atmospheric oxygen. The temperature in the heat treatment is set so that the pyrolyzable polymer, optionally also the polymer precursor (if it has not been converted completely into the polymer), decompose(s) to form amorphous carbon.

This process results in lithium-intercalating carbon particles which are coated in a shell-like manner by an amorphous carbon layer in which the silicon particles are embedded. These can be used as active material for the electrodes of electrochemical cells and are characterized by a very high cycling stability. The amorphous carbon layer inhibits contact of the silicon particles and the lithium-intercalating carbon particles with the electrolyte of the cells and thereby prevents excessive losses of mobile lithium, as can occur in the above-described SEI formation.

Composite materials composed of graphite and silicon are already known. Thus, for example, DE 10 2008 063 552 A1 discloses an active material having a core-shell structure. The core consists of a graphite particle and the shell consists of metallic silicon which is preferably formed by thermal decomposition of a silane.

U.S. Pat. No. 6,589,696 B2 discloses an active material which comprises graphite particles on the surface of which microsize silicon particles are arranged and embedded in an amorphous carbon film. In particular, this has similarities to active material which can be produced by the above process, but differs from such material in one important aspect, namely the size of the silicon particles. In contrast to the particles described in U.S. Pat. No. 6,589,696 B2, our particles are nanosize, i.e. very much smaller.

This difference is important for various reasons. In particular, we found that replacement of the microsize silicon particles by nanosize particles has very positive effects on the cycling stability of the active material and thus also on the life of an electrochemical cell or battery having an active material of this type. This is attributed to the fact that nanosize silicon particles are subject to a very much smaller absolute volume expansion than microsize silicon particles during incorporation and release of lithium ions. Correspondingly, mechanical stressing of the immediate environment of the silicon particles within an electrode is also lower. This environment is formed by the abovementioned amorphous carbon resulting from the decomposition of the polymer or optionally of the polymer precursor. This forms a type of matrix in which the nanosize silicon particles are enclosed. The matrix ensures good electrical contacting, first among the silicon particles and second with the lithium-intercalating carbon particles enveloped by the amorphous carbon layer.

The use of nanosize silicon particles results in not any desired polymer or not any polymer precursor being able to be used. The polymer materials described in U.S. Pat. No. 6,589,696 B2, in particular, are sometimes completely unsuitable for use in combination with nanosize silicon particles. This is because neither the polymer materials themselves nor their decomposition products are allowed to lead to oxidative passivation of the silicon particles. If, for example, the cellulose resins described in U.S. Pat. No. 6,589,696 B2 are used in combination with nanosize particles, this results in an active material having a significantly lower specific capacity than would have been expected a priori. This is attributed to the fact that a cellulose resin obviously bears a large amount of active oxygen in the form of free hydroxy groups which in a heat treatment reacts with the nanosize silicon particles which, due to their small size, have a very high reactivity and form silicon dioxide, i.e. part of the metallic silicon used becomes deactivated.

Instead, the materials epoxy resin, polyurethane resin and polyester resin are used as component 3. Although all these components likewise have oxygen atoms as a structural element on a molecular level, the oxygen atoms are not in the form of free hydroxy groups. The materials mentioned can be decomposed on contact with nanosize silicon particles at sufficiently high temperatures without excessive oxidation of the silicon used occurring.

Particular preference is given to using an epoxy resin, in particular an epoxy resin based on bisphenol A and epichlorohydrin, as component 3. Both materials are known as starting materials for epoxy resins and do not have to be explained further.

Particularly preferably, the mixture comprises amorphous conductive carbon black as component 4 in addition to the components 1 to 3. We surprisingly found that this addition has very positive effects on the internal conductivity of the active material and also structure-stabilizing properties. This would not have been expected a priori since the polymer is in any case ultimately converted into amorphous carbon so that the additional addition of conductive carbon black appears to be superfluous. However, in actual fact, the active materials produced from the abovementioned four components generally display a higher cycling stability than is the case for active materials produced using only the components 1 to 3.

The following parameters can also have effects on the result of the process:

The proportion of silicon particles in the mixture: this is preferably set to a value of 10% by weight to 50% by weight.

The proportion of lithium-intercalating carbon particles in the mixture: this is preferably set to a value of 20% by weight to 80% by weight.

The proportion of the amorphous conductive carbon black in the mixture: this is preferably set to a value of 1% by weight to 20% by weight.

The proportion of pyrolyzable polymer or polymer precursor in the mixture: this is preferably set to a value of 20% by weight to 80% by weight.

The proportions by weight indicated are preferably in each case based on the total weight of the mixture, i.e. on the sum of the masses of the components 1 to 3, optionally also 4.

To produce the mixture, we found it to be particularly advantageous to initially charge component 3 as a solution in a solvent and disperse the components 1, 2 and, optionally, component 4 in this solution. Here, it can be useful to subject the components 1, 2 and, optionally, component 4 to predispersion in the solvent, i.e. to add these components in dispersed form to the solution composed of component 3 and the solvent. Suitable solvents are, for example, alcohols such as 1-methoxy-2-propanol, particularly in the case of epoxy resins as component 3.

A hardener for the polymer or the polymer precursor is preferably added to the mixture, preferably after the components 1, 2 and optionally component 4 have been dispersed in the solution as described above. In the case of the use of epoxy resins as component 3, the hardener is preferably an amine hardener. Such hardeners for epoxy resins are also known and require no further explanation. Particular preference is given to using 3-(dimethylamino)-1-propylamine as amine hardener.

Preferably, the solvent mentioned is removed from the mixture before the heat treatment. At the latest during this, the polymer or the polymerizable polymer precursor also crosslinks under the action of the optionally added hardener.

In the heat treatment, the mixture is preferably subjected to a temperature of 500° C. to 1200° C. The exact temperature is dependent primarily on the nature of the component 3. When an epoxy resin is used as component 3, the temperature is preferably 600° C. to 1100° C.

It may be preferred to carry out the heat treatment in a reducing atmosphere or under protective gas. We found it to be advantageous to exclude atmospheric oxygen as far as possible in the reaction.

Particularly when a hardener is added, the mixture is, at the latest after removal of the solvent mentioned, generally present as a one-piece block. In these cases, it can be advantageous to comminute, preferably pulverize, the mixture before the heat treatment.

We also provide the active material which can be produced by our process. In accordance with what has been said above, it comprises lithium-intercalating carbon particles whose surface is at least partly covered with a layer of amorphous carbon in which nanosize silicon particles are embedded. The active material particularly preferably consists of such particles.

The active material can be processed further with an electrode binder, e.g. sodium carboxymethylcellulose, and optionally a conductivity-improving additive to give an electrode for lithium ion cells, in particular a negative electrode. Such electrodes and electrochemical cells having such electrodes are also provided by our methods.

The active material represents an alternative to the conventional anode material graphite for lithium ion batteries. The combination of the structurally stable, comparatively low-capacity lithium-intercalating carbon particles with the high-capacity nanosilicon has enabled an extraordinarily structurally stable anode material for lithium ion batteries to be developed. The core/shell structure and the use of nanosilicon in the anode material has made it possible to avoid the structural lability during charging/discharging of the silicon and thus to produce a structurally stable anode material despite the large volume and structure changes during charging/discharging when using silicon.

Further features can be derived from the following description of the figures and preferred examples. Here, individual features can in each case be realized on their own or a plurality thereof can be realized in combination with one another in one example. The preferred examples described merely serve to explain and give a better understanding and are not to be construed in any way as implying a restriction.

WORKING EXAMPLES AND COMPARATIVE EXAMPLES (1) To produce an active material, the epoxy resin Araldit® 506 was initially charged in the solvent 1-methoxy-2-propanol and brought completely into solution by stirring. Nanosize silicon, carbon black and graphite were subsequently mixed into the epoxy resin dissolved in the solvent in the following ratio with stirring:

| Composition | |
|---|---|
| Nanosilicon | >10% |
| Carbon black | >3% |
| Graphite | <80% |

Only after these components were completely dispersed was the epoxy hardener (3-dimethylaminopropylamine) added to the solution. After curing the mixture in a drying oven at 60° C., the active material was comminuted by a mortar. The product produced was subsequently calcined at a temperature of 900° C. under protective gas for a number of hours in a furnace.

To demonstrate the advantage of the use of an epoxy resin, an otherwise comparable active material was produced without epoxy resin.

Electrodes were made from our material and from the comparative material and connected opposite reference electrodes. The electrodes were characterized electrochemically by cyclic voltammetry and constant current cycling. It was found therefrom that the use of the epoxy resin as coating material has a positive influence on the electrode performance of the active material.

FIG. 1 shows the first cycle of a cyclic voltammogram of the two electrodes. In contrast to the sharp narrow peaks of the voltammogram of the electrode using the epoxy resin, the voltammogram of the electrode without epoxy resin displays significantly broader peaks, which indicates poorer electrode kinetics.

Figure 2:
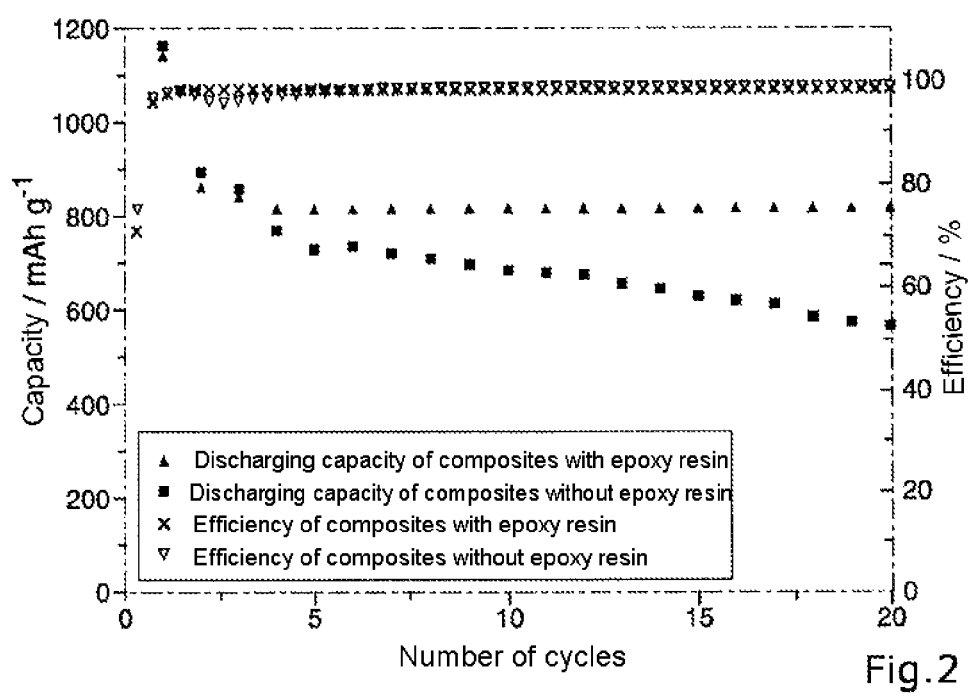
FIG. 2 is a graph showing constant current cycling of comparative electrodes.

FIG. 2 shows the constant current cycling of the comparative electrodes. These show that a much greater capacity decrease occurs in the case of the active material without epoxy resin than in the case of the active material with epoxy resin, which is in turn attributable to poorer particle contact because of the absence of the epoxy resin and thus the amorphous carbon matrix.

Both the cyclic voltammograms and the constant current cycling show that addition of an epoxy resin in the case of the nanosilicon/carbon black-graphite core-shell composite has a positive effect on the electrochemical behavior of the active material. We believe that this is primarily attributable to the better contact of the particles among one another and the associated greater compactness of the overall particle.

(2) The active material produced as per (1) using the epoxy resin was examined spectroscopically.

Figure 3:
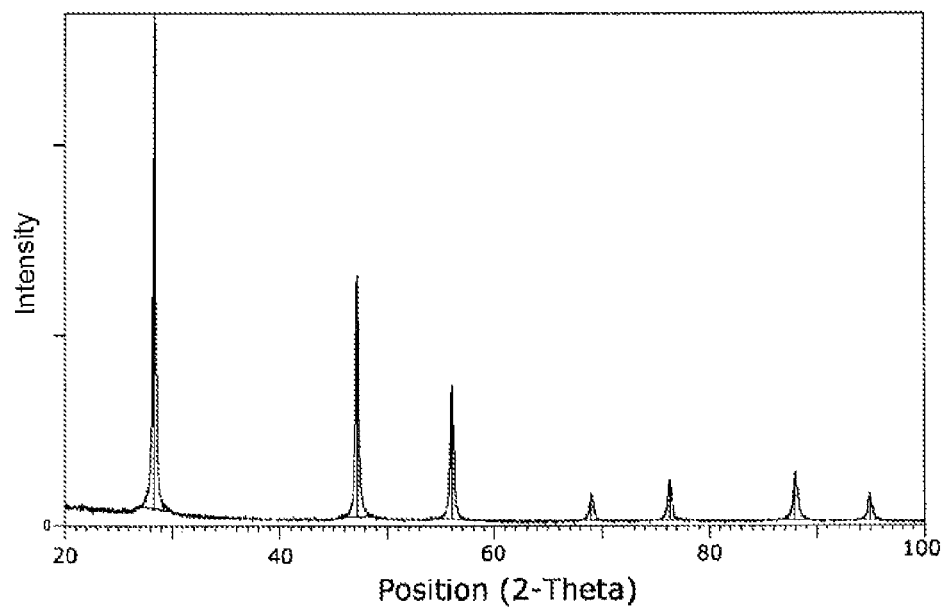
FIG. 3 shows an XRD spectrum of an example of our active material.

FIG. 3 shows the XRD spectrum of the active material. This shows no indication of the presence of silicon dioxide. The diffraction peaks at 28.35° and 47.5° can be assigned to the (111) and (220) planes of cubic silicon.

(3) Using a procedure analogous to (1), an active material was produced using sodium carboxymethylcellulose in place of the epoxy resin. $SiO_2$ was formed in the pyrolysis of the mixture of the nanosilicon, the carbon black, the graphite and the sodium carboxymethylcellulose.

Figure 4:
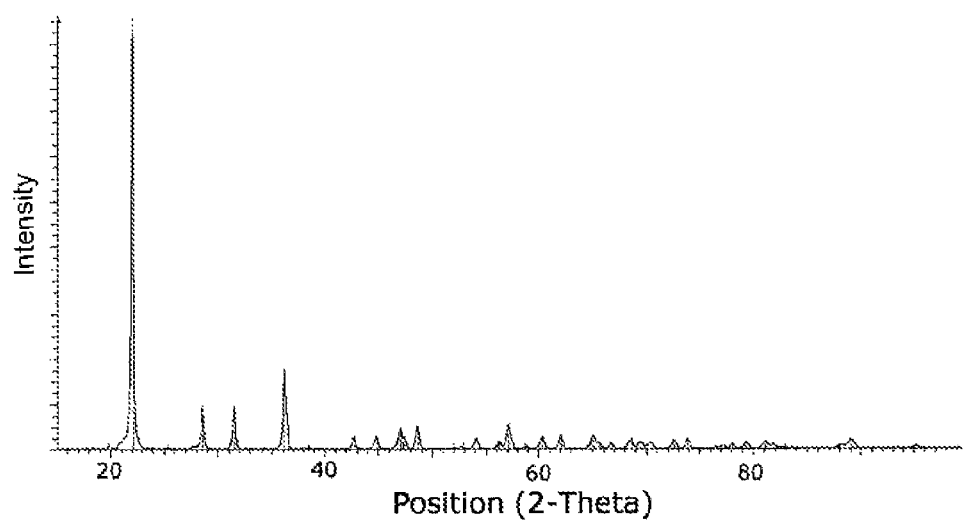
FIG. 4 shows an XRD spectrum of another example of our active material.

FIG. 4 shows the XRD spectrum of this active material. The diffraction peak at 22.0° can be assigned to amorphous $SiO_2$. The diffraction peaks at 28.35° and 47.5° can in this case, too, be assigned to the (111) and (220) planes of cubic silicon.

(4) To demonstrate the differences in the composite materials produced shown by XRD for use in lithium ion batteries, too, our active material produced as per (1) using epoxy resin and the active material produced as per (3) were processed into electrodes. For this purpose, an aqueous slurry having a paste-like consistency and comprising 87% by weight of the respective active material, 5% by weight of carboxymethylcellulose and 8% by weight of a conductivity additive (conductive carbon black) was produced in each case. The electrode paste was then applied in a thickness of 50 μm to copper foil by a film drawing apparatus. After a drying step, electrodes were stamped out of this. These were dried at 120° C. and $10^{-3}$ mbar, weighed and dried again.

The electrodes were subsequently installed in Swagelok measurement cells. Reference electrode and counterelectrode were in each case formed by metallic lithium. EC/EMC 3:7 (v:v) 1 M $LiPF_6$+2% vinylene carbonate was used as electrolyte. For the cyclic voltammetry measurements, lithiation and delithiation were carried out at an advance rate of 30 μV/s.

Figure 5:
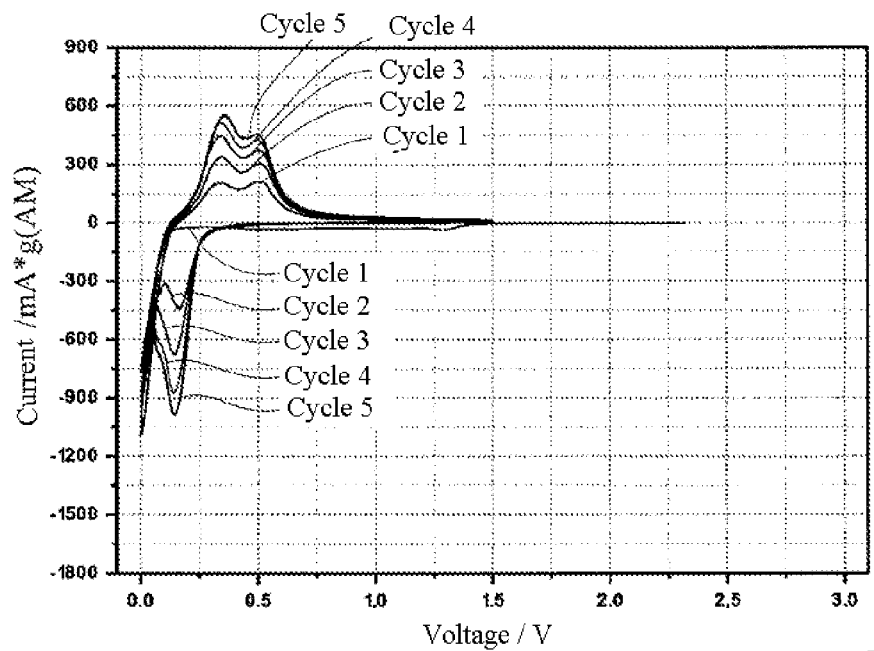
FIG. 5 is a graph showing the first five cycles for electrodes made from our active material.

FIG. 5 shows the first five cycles measured for the electrodes having our active material.

Figure 6:
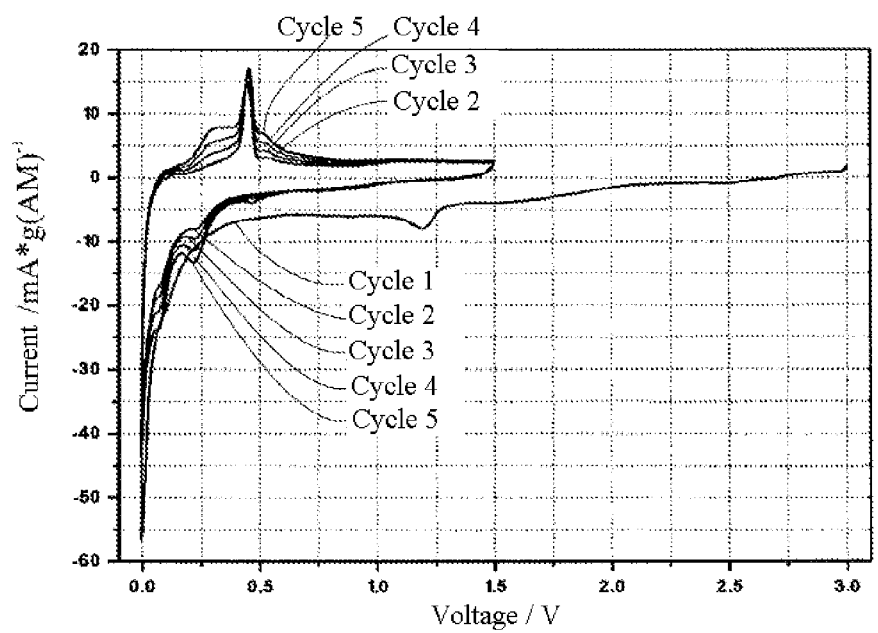
FIG. 6 is a graph showing the first five cycles measured for electrodes of our active material made from sodium carboxymethyl cellulose.

FIG. 6 shows the first five cycles measured for the electrodes having the active material produced using sodium carboxymethylcellulose.

Prevention of reversible lithiation by the $SiO_2$ layer formed can be seen very clearly from the different capacity values achieved. In contrast, the carbonized silicon particles allow very high capacity values in lithiation of these.

The invention claimed is:

1. A process of producing active material for an electrode of an electrochemical cell containing sodium carboxymethylcellulose comprising:
   providing lithium-intercalating carbon particles having an average particle size of 1 μm to 100 μm as component 1,
   providing silicon particles having an average particle size of 5 nm to 500 nm as component 2,
   providing a polymer or polymer precursor which can be pyrolyzed to form amorphous carbon and is selected from the group consisting of, an epoxy resin based on bisphenol A and epichlorohydrin, polyurethane resin and polyester resin, as component 3,
   mixing components 1 to 3 into a mixture such that component 3 comprises 20 to 80 wt % of the mixture, and
   heat treating the mixture substantially in the absence of atmospheric oxygen at a temperature at which the pyrolyzable polymer or the pyrolyzable polymer precursor decomposes to form amorphous carbon.

2. The process as claimed in claim 1, wherein the mixture comprises amorphous conductive carbon black as component 4.

3. The process as claimed in claim 1, wherein:
   a proportion of silicon particles in the mixture is 10% by weight to 50% by weight; and/or
   a proportion of lithium-intercalating carbon particles in the mixture is 20% by weight to 80% by weight; and/or
   a proportion of the amorphous conductive carbon black in the mixture is from 1% by weight to 20% by weight.

4. The process as claimed in claim 1, wherein component 3 is initially provided as a solution in a solvent and the components 1 and/or 2 are dispersed in the solution.

5. The process as claimed in claim 1, further comprising adding a hardener for the polymer or the polymer precursor to the mixture, after components 1 and/or 2 have been dispersed in the solution.

6. The process as claimed in claim 5, wherein the solvent is removed before the heat treatment.

7. The process as claimed in claim 1, wherein the mixture is heat treated at a temperature of 500° C. to 1200° C.

8. The process as claimed in claim 1, wherein the heat treatment is carried out in a reducing atmosphere.

9. The process as claimed in claim 1, wherein the cured mixture is pulverized before the heat treatment.

10. The process as claimed in claim 2, wherein component 3 is initially provided as a solution in a solvent and the components 1, 2 and/or 4 are dispersed in the solution.

11. The process as claimed in claim 2, further comprising adding a hardener for the polymer or the polymer precursor to the mixture, after components 1, 2 and/or 4 have been dispersed in the solution.

12. The process as claimed in claim 11, wherein the solvent is removed before the heat treatment.

* * * * *